United States Patent [19]

Cooley

[11] 3,988,537

[45] Oct. 26, 1976

[54] ILLUMINATING AND TRANSMITTING SYSTEM

[76] Inventor: Austin G. Cooley, 690 W. Second St., Reno, Nev. 89503

[22] Filed: June 14, 1974

[21] Appl. No.: 479,205

[52] U.S. Cl................................... 178/7.6; 178/7.1; 178/DIG. 28; 355/67

[51] Int. Cl.²...................... H04N 3/08; H04N 1/10; G03B 27/54

[58] Field of Search............. 178/DIG. 27, DIG. 28, 178/7.2, 7.6, 7.92, 6.8, DIG. 5, 7.1; 350/162 SF, 162 ZP, 171, 172, 285, 26; 358/53, 55, 6, 54; 355/40, 67

[56] References Cited

UNITED STATES PATENTS

| | | | |
|---|---|---|---|
| 2,226,508 | 12/1940 | Clothier | 178/7.6 |
| 2,976,362 | 3/1961 | Stamps | 178/7.6 |
| 3,519,331 | 7/1970 | Cutrona et al. | 350/162 |

*Primary Examiner*—John C. Martin
*Attorney, Agent, or Firm*—M. Michael Carpenter

[57] ABSTRACT

A scanning system is disclosed for translucent or X-ray film which circumvents the need for a wide angle, large entrance pupil lens as used in the conventional oscillating mirror scanning system. The scanning system is divided into two distinct and separate systems including a scanning optical system having an oscillating mirror which includes in its assembly a single element meniscus lens serving as an objective or first lens in the system. Coupled to the oscillating mirror assembly is a slotted aperture plate located at the image focal point which establishes the "X" dimension of the scanned element area upon the film. The aperture plate is moved in parallel along the scanning optical axis to follow the focal point as the distance from the objective lens to the scanned element area varies during the sweep of a scanned line. An illuminating optical system for establishing the "Y" dimension of the scanned element area upon the film includes a light source and first and second cylindrical lenses having an illuminating aperture plate disposed therebetween. Through the illuminating optical system diffraction and stray light are substantially eliminated, while little or no spectral radiation passes from the scanned image to the detector cell in the scanning optical system.

4 Claims, 6 Drawing Figures

ILLUMINATING AND TRANSMITTING SYSTEM

BACKGROUND OF THE INVENTION

1. Field of Invention

The present invention relates generally to a facsimile optical scanning device and more particularly to an optical system for the high-speed scanning of X-ray film or similar translucent film.

2. Description of Prior Art

Several facsimile systems for scanning a document or film have been reduced to practice employing rotating or oscillating mirrors that sweep a beam of illuminating light passing through a stationary lens from side to side across the document or film. To accommodate the sweeping beam of illuminating light which is usually swept at a 15° half angle, the stationary lens has to be a wide angle, large entrance pupil lens. Generally, the light beam is distorted at the ends of the sweep with a resulting loss of resolution and information, due to the varying focal lengths, aberrations and vignetting inherent in the optical system. At the expense of reduced optical efficiency, the size of the light beam is frequently limited to reduce aberrations and vignetting.

The focal length of the optical pat from the scanned line on the document or copy to the stationary or objective lens increases as the scan moves to the side of the document and the off center angle increases. The image on a fixed lens therefore goes out of focus. The W. Herriott patent, U.S. Pat. No. 2,262,584, entitled "Scanning Apparatus," which issued Nov. 11, 1941, shows a mechanism which moves one lens and a mirror to overcome the focus problem caused by the varying focal length.

As newer facsimile systems have been developed, it is not surprising that higher scanning speeds were sought. In such systems, it is known to illuminate a document by focusing a light source on a scanned element area through a condensing lens system while scanning the scanned element area with a second lens system which focuses a smaller portion of the scanned area as a real image upon a photoelectric cell. My patent, U.S. Pat. No. 2,894,064, entitled "High-Speed Facsimile Transmission System," which issued July 7, 1959, shows such a system. In this type of system, the light source, photoelectric cell and associated optics may be platform mounted and moved across the document as a single unit. While the resolution of such a system is acceptable, the scanning speed of such a system is still limited.

SUMMARY OF THE INVENTION

The present invention accomplishes high-speed scanning of a document or film, obviates the need for a large, highly corrected objective lens and eliminates most of the optical aberrations caused by the use of such a lens. This is accomplished by assembling a simple thin lens with an oscillating mirror and mounting the low inertia assembly in the optical axis of a scanning optical system. A scanning aperture plate upon which the image from the mirror is focused is moved back and forth along the scanning optical axis to follow the focal point of the scanned element area on the document or film as the mirror oscillation sweeps the document.

The lens and mirror assembly has such low inertia that it can sweep very rapidly, approximately 1,000 times per minute, which is ten times the rate of scanning of documents or pictures scanned by prior art facsimile systems for news picture services.

The document or film is illuminated by an illuminating optical system including a light source which is passed through a first simple cylindrical lens which focuses the image of the source on an illuminating aperture plate having a generally large longitudinal slit. A second cylindrical lens focuses the slit image as a line upon the document or film to illuminate the full width of the film while the height of the illuminated line establishes the "Y" dimension of the scanned element area. The aperture within the scanning aperture plate of the scanning optical system is arranged to establish the "X" dimension of the scanned element area. The separate creation of the X and Y scanned element dimensions creates a high-speed scanning system without degrading the resolution of the optical system.

The optical system thus described accomplishes the objectives of high-speed scanning and high resolution; eliminates loss of contrast due to diffraction of the light beam; reduces the loss of contrast due to stray light from excessive light surrounding the scanned element area; and eliminates or controls the loss of contrast due to high energy levels of spectral radiation.

Other objects and advantages of the present invention will become more apparent to those skilled in the art to which this invention pertains after careful consideration of the specification in view of the drawings.

DESCRIPTION OF THE PREFERRED EMBODIMENT

Figure 1:
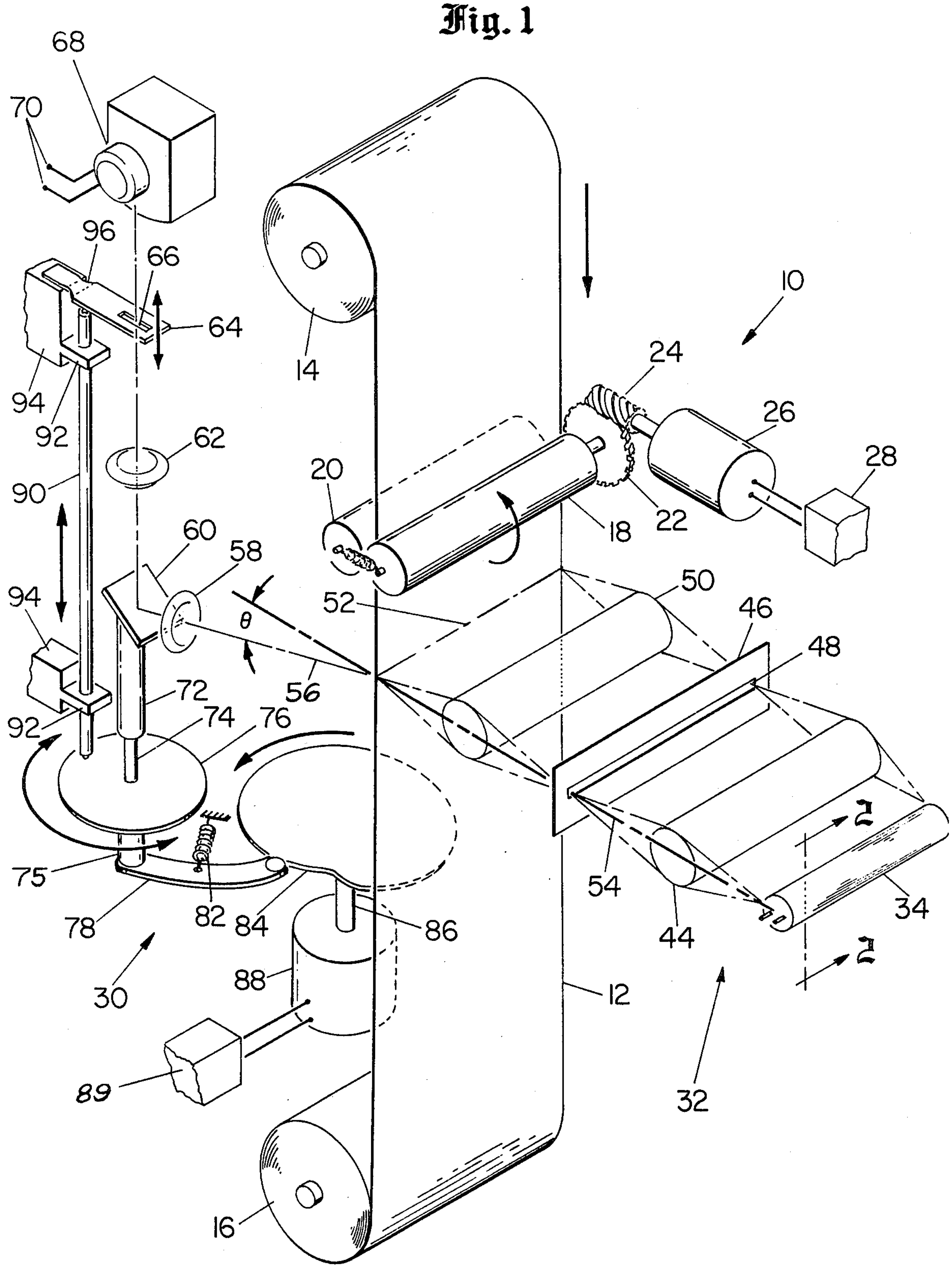
FIG. 1 is a perspective view of the scanning system illustrating the scanning and illuminating optical systems utilized in the present invention.

Referring now to the drawings, FIG. 1 illustrates a scanning system 10 for scanning a document or film such as a translucent or X-ray film 12. In the embodiment illustrated, the film 12 is fed from a supply roller 14 to a take-up roller 16 by the driving action of a driving capstan 18 and pinch roller 20. The driving capstan 18 is driven in the direction illustrated by a worm gear 22, in turn driven by worm 24 and a synchronous motor 26 which is connected to an energizing power source 28. While the film 12 has been illustrated as a continuous sheet unwrapped from the supply roller 14 and wrapped upon the take-up roller 14, it shall be understood by those skilled in the art that a moving platform can be provided upon which individual pieces of translucent film may be mounted, such as an X-ray film or plate. In such an arrangement, the supporting platform can be provided with means for gripping the edge of the translucent film to enable light from the illuminating optical system to pass through the translucent film 12. Alternately, the X-ray film may be rigid enough to support itself, thus eliminating the need for a platform.

Figure 2:
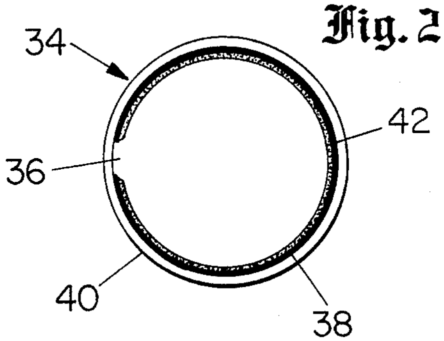
FIG. 2 is a cross section detail of the light source within the illuminating optical system taken along lines 2—2 of FIG. 1.

The scanning system 10 of the present invention is comprised of two separate optical systems, including the scanning optical system 30 and the illuminating optical system 32. The light source within the illuminating optical system comprises a fluorescent lamp 34 having an elongated longitudinal aperture 36 formed thereon, as best illustrated in FIG. 2. The aperture 36 is formed by a reflective coating 38 which completely surrounds the inner surface of the glass bulb 40, but for the elongated longitudinal aperture 36. Coated upon the reflective coating 38 is a second coating 42 of phosphor which completes the fluorescent lamp. The fluorescent lamp 34 which is employed in the scanning optical system 32 to scan the full width of the X-ray film has an aperture length of approximately 16 inches and an aperture width of 0.3 inches.

The aperture 36 of the light source 34 acts as an object for a first condensing lens 44 formed from a cylindrical lens. The image of the aperture 36 is focused by condensing lens 44 upon an illuminating aperture plate 46 having an elongated aperture 48 or stop therein. A second condensing lens 50 formed from a cylindrical lens focuses the object of the aperture 48 as an image upon the translucent film 12 to illuminate a transverse scanning line 52 across the full 14-inch width of the translucent X-ray film 12. The transverse scanning line 52 has a height, in the present embodiment, of approximately 0.02 inches, which establishes the Y dimension of a scanned element area within the scanning system 10, as will be described hereinbelow.

Figure 3:
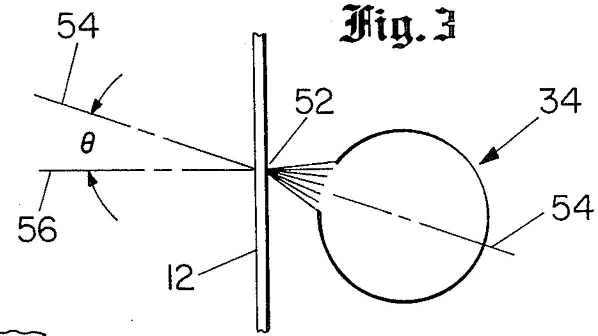
FIG. 3 is a schematic detail of the light beam emerging from the second cylindrical condenser lens of the illuminating optical system.

The illuminating optical system including the first and second cylindrical condensing lenses 44 and 50 and the illuminating aperture plate 46 establishes an illuminating optical axis 54 best illustrated in FIG. 3. A scanning optical axis 56 established by the scanning optical system 30 is preferably displaced from the illuminating optical axis 54 by an amount nearly equal to or greater than the angle of the converging beam emanating from the second cylindrical lens 50 to illuminate the transverse scanning line 52. This angle is illustrated as the angle $\theta$ in FIG. 3.

The scanning optical axis 56 is established by an objective meniscus lens 58 which collimates the light beam from the transverse scanning line 52 passing through the translucent film 12 upon a mirror 60 which, in turn, reflects the near parallel light beam emerging from the meniscus lens 58 onto a second collimating lens 62. The light beam from lens 62 is focused upon a scanning aperture plate 64 having an elongated aperture 66 therein. Light emanating from the aperture 66 falls upon a photoelectric cell 68 whose varying electrical output at output terminals 70 is utilized to produce an electrical signal representing the content of the scanned translucent X-ray film 12.

The combination of the meniscus lens 58, mirror 60, collimating lens 62, aperture plate 64 and photoelectric cell 68 establishes the scanning optical axis 56 which, as mentioned above, is offset from the illuminating optical axis 54 by the angle $\theta$. If the angle $\theta$ is larger than illustrated in FIG. 3 and the film being scanned has a density of below 0.3, most of the light will pass through the film without being diffused enough to pass on to the photoelectric cell 68. Therefore, less signal will be produced when scanning areas of low density than when scanning darker areas. This lack of contrast can be eliminated by adjusting the angle $\theta$ to permit a small amount of the light beam from the illuminated transverse scanning line 52 to follow the scanning optical axis 56 of the scanning optical system 30.

If the illuminating optical axis 54 and scanning optical axis 56 are in line, the photoelectric cell 68 may receive spectral or glare light from the fluorescent lamp 34. If the angle $\theta$ between the two axes is low, that is to say, 5° above axis, the problem of spectral light is still severe. The photoelectric cell 68 then looks directly into the light emanating from the fluorescent lamp 34 and receives excess glare similar to that experienced by an automobile driver who is driving into the sun and bothered by both direct sunlight and light reflecting from the hood of his automobile. If the angle $\theta$ is large, for example, 15°, only a small percentage of the light is on axis and the photoelectric cell 68 is not severely exposed to spectral light.

Through the use of the illuminating optical system 32, the width of the transverse scanning line 52 is reduced from 0.3 inches at the aperture 36 to less than 0.02 inches at the transverse scanning line 52. This 15 to 1 reduction is accomplished in two stages by the cylindrical lenses 44 and 50. A first image is produced at the position of the aperture or stop 48 which, in the present embodiment, has an image width of 0.1 inches. Diffraction caused by such a large aperture or stop is thereby substantially reduced. The stop formed by aperture 48 filters out unwanted light, such as surface light from the fluorescent lamp 34, that does not pass through the aperture 36 and reflections developed in the cylindrical lens 44.

If the mask were reduced in width, for example, to the scanning line width of 0.02 inches, and this light used to illuminate the transverse line 52 on the film 12, diffraction would severely reduce the ratio of light-to-dark signals ultimately detected by the photoelectric cell 68 when scanning thin black lines in low density areas. In the present invention, this problem is avoided by the second cylindrical lens 50 which brings the width of the illuminated scanning line down to the desired narrow width without use of a second stop or aperture.

Figure 6:
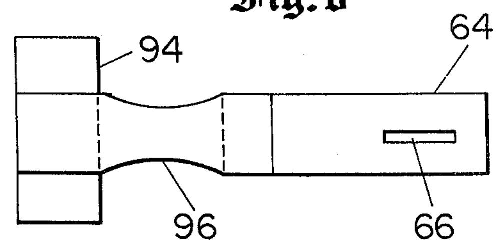
FIG. 6 is an enlarged detail of the scanning aperture plate.

In prior art systems, this diffraction can be avoided in a single stage optical system using no stop or large aperture if the area to be scanned is defined by the aperture 64 in both the X and Y dimensions, i.e., along the length of the scanned line and across the scanned line. The illuminated transverse scanning line 52 is then much wider than the line to be scanned. In this type of system, the signal contrast of a thin black line is low because the excess light from the wide illuminated area is primarily responsible for stray reflections in the scanning optical system that pass through the aperture 66 on to the photoelectric cell 68 when that cell receives an image of a black line. In scanning a thin black line in a light area of an X-ray film, the light that passes through the dark area having a density of 3.0 is 1/1000 the light projected onto the film. With conventional optics, it is virtually impossible to image on the aperture plate 64 light having this ratio when the objective lens 58 is flooded with off axis stray light. This off axis light is reduced to a minimum by making the width of the illuminated transverse scanning line 52 equal to or less than the width of the scanned line. In this way, the Y dimension of the scanned element area is defined by the width of the illuminated transverse scanning line 52. The X dimension is defined by the width of the slitted aperture 66 in the aperture plate 64, as shown in FIG. 6.

It would not, in the present embodiment, be practical to have an aperture 66 which defines both the X and Y dimensions when the line upon the film 12 being scanned is equal to or less than the Y dimension because of the high precision of optical alignment required to image the illuminated line on the aperture over a long sweep, for example, 14 inches. The slit 66 allows for considerable misalignment. In a typical system, the distance from the objective lens 58 to the scanned film is over 24 inches. If the conventional approach of establishing both X and Y dimensions of the scanned element area by utilizing a pin-hole aperture at 66 were used, the optical system would have to be housed in a heavy, rugged frame including a casting having a width of 16 inches and a length of 24 inches.

The present invention establishes the Y dimension through the utilization of the transverse scanning line 52 and establishes the X dimension through the utilization of the slit 66 to define a relatively samll scanned element area. The optical system eliminates diffraction while providing a small scanned element area for improved resolution. The system passes to the photoelectric cell 68 a light beam having a high contrast ratio when scanning a thin black line in a light area, the thin black line having a width (X dimension) approximately equal to the Y dimension of the transverse scanning line 52 or 0.02 inches. This is because the effect of diffraction and stray light is substantially reduced by the present invention.

Figure 4:
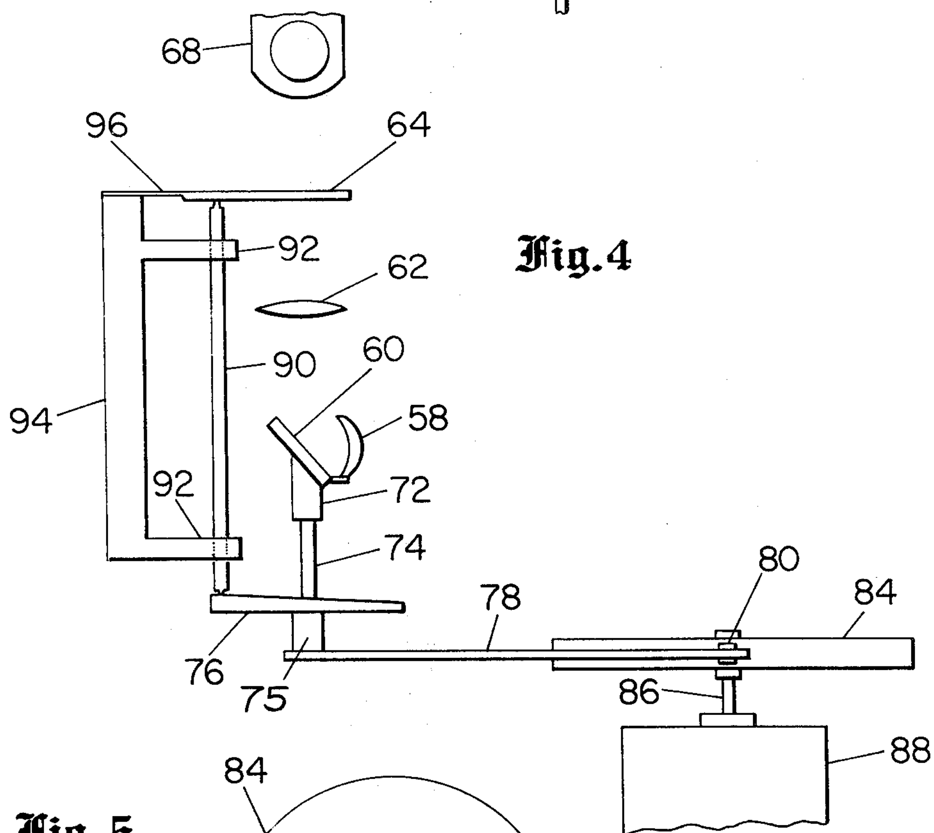
FIG. 4 is a side, elevational view of the scanning optical system shown in FIG. 1.
Figure 5:
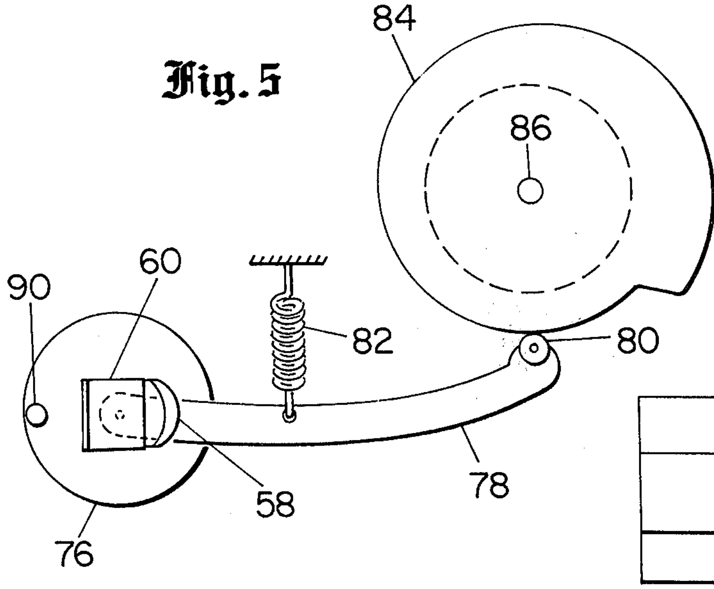
FIG. 5 is a plan view showing the cam system which drives the scanning optical system.

Referring now to FIGS. 4 and 5, the scanning mechanism of the scanning optical system 30 is shown to include the objective meniscus lens 58 mounted with the mirror 60 upon a pedestal 72 attached to a shaft 74. The pedestal 72 and shaft 74 are rotatively mounted on ball bearings within a bearing housing, not shown. The lower end of the shaft 74 is suitably reduced and shouldered to receive a mounting hub 75 of a cam 76. The mounting hub 75 also mounts an arm 78 and cam follower 80, which are spring loaded by a spring 82 against a cam 84. The cam 84 is rotatively mounted upon a shaft 86 of a suitable synchronous motor 88 energized by a second power source 89.

The cam 84, best illustrated in FIG. 5, displaces the cam follower 80 and arm 78 to rotate the shaft 74, objective meniscus lens 58 and mirror 60 through a repetitious oscillation of approximately 30°. As those skilled in the art will note, cam 84 is designed to cause the point upon which the lens and mirror are focused to sweep across the transverse scanning line 52 on the film 12 to the outer edge thereof where the low inertia assembly is rapidly returned to the beginning of the sweep at the other edge of the film.

The mirror 60 and its objective lens 58 are mounted on the center line of the axis of rotation of the shaft 74 to reduce the inertia of the assembly. While the lens is slightly off axis, its mass is low due to its simple, thin meniscus construction. The long focal length and on axis operation of the lens 58 makes it unnecessary to use a thick, highly corrective lens as in prior art arrangements. In the preferred embodiment, the thin lens 58 may be trimmed to a square shape to match the mirror 60 behind it, for example, ¾ × ¾ inches. The lens assembly may be swept across the film at a scan rate of 720 scans per inch with a follower pressure of only 100 grams.

The near parallel beam of light energy emerging from the meniscus lens 58 is reflected by the mirror 60 upon the collimating lens 62. As the lens 58 and mirror 60 sweep the film 12, the length of the scanning beam will vary about 0.9 inches from the center of the scan to either edge of the film 12. The focal point at the output of the lens system thus varies 0.09 inches if the photographic reduction is 10 to 1. To maintain the focus on the aperture plate 64, it is parallelly moved along the scanning objective axis 56 at a distance of 0.09 inches. Because of the depth of focus, satisfactory results have been obtained if the movement is only 0.05 inches. This is easily accomplished by pushing the aperture plate 64 with a suitable cam rod 90 riding upon the cam 76. The cam 76, as best illustrated in FIG. 4, is provided with a sloping surface which, as it is rotated 30° by the arm 78, follower 80 and cam 84, causes the cam rod to rise and fall approximately 0.05 inches. The cam rod is mounted within journal bearings, as is well known, which are mounted within arms 92 attached to a main frame 94. The tips of the cam rod are formed from bearing material, such as synthetic sapphire, as is cam follower 80. The aperture plate 64 is attached to the main frame 94 by a suitable spring 96. As the cam 76 is rotated in an oscillating manner through 30°, the rod 90 pushes against the aperture plate 64 for causing that plate to oscillate up and down through 0.05 inches in parallel along the scanning optical axis 56.

Through the utilization of the slitted aperture 66, any portion of the transverse scanning line 52 is automatically on center as it is projected by the scanning optical system 30 along the scanning optical axis 56 onto the aperture. This arrangement avoids the many aberrations common to the prior art systems of varying the angle of the light beam that passes through a stationary lens. Improved contrast and resolution is accomplished through the utilization of the two optical systems including the illuminating optical system 32 and the scanning optical system 30 in which the first system 32 establishes the Y dimension of the scanned element area by establishing the width of the transverse scanning line 52, while the second or X dimension of the scanned element area is established by the width of the aperture 66.

Because the system formed by lens 58 and mirror 60 is lightweight, balanced and closely mounted to the axis of rotation of the shaft 74, the mirror and lens system has a substantially lower inertia than most prior art arrangements and is capable of much higher speed scanning than the prior art system.

The high-speed scanning system thus described is capable of scanning relatively thin lines upon a translucent film such as X-ray film in a manner which provides high contrast through the elimination of diffraction, aberration, vignetting, reduced stray light and reduced spectral radiation.

The embodiments of the invention in which an exclusive property or privilege is claimed are defined as follows:

1. In an illuminating system for illuminating a sheet containing information, the improvement comprising:

a light energy source having a longitudinal aperture for emitting a wide beam of light energy having a reduced height dimension compared to its width;

a stop having a wide stop aperture therein with a reduced height dimension compared to its width;

a first cylindrical condensing lens arranged between said light source and said stop for focusing said light energy upon said stop aperture, the height dimension of said stop aperture being relatively large to reduce diffraction;

a second cylindrical condensing lens arranged between said stop and said sheet for focusing upon said sheet said light energy from said stop aperture for permanently and uniformly illuminating with the image of said light source aperture a wide transverse area upon said sheet whose height dimension is relatively samll compared to the height of said light source aperture and the height of said stop aperture for eliminating diffraction at said illuminated area while providing a wide permanently and uniformly illuminated transverse area upon said sheet having a relatively small height.

2. An illuminating system for illuminating a sheet as claimed in claim 1 wherein said light energy source includes a tubularly shaped lamp with the inner cross-sectional surface of said tube coated by a reflective coating but for a narrow uncoated arc of said cross-sectional surface, said uncoated arc extending along the full length of said tube to form said longitudinal aperture.

3. An illuminating system for illuminating a sheet as claimed in claim 1 wherein the reduced height dimension of said stop aperture is one-third the height of said light source aperture and the permanently illuminated transverse area upon said sheet is one-fifteenth or less of the height of said light source aperture.

4. An illuminating system for illuminating a sheet containing information as claimed in claim 1 additionally comprising:

said sheet containing information comprising a translucent film;

a detector sensitive to said illuminating light energy;

means for focusing upon said detector said permanently illuminated transverse area upon said film arranged on a side of said film opposed from said illuminating system;

said means for focusing upon said detector including a second aperture wherein said permanently illuminated transverse area upon said film establishes the Y dimension of said film to be scanned by said detector and said second aperture establishes the X dimension;

said illuminating system formed along a first optical axis and said means for focusing upon said detector formed along a second optical axis; and said first and second optical axes offset at an angle from each other on opposite sides of said translucent film to reduce spectral radiation from said film to said detector.

* * * * *